United States Patent [19]
Hesse

[11] 3,892,383
[45] July 1, 1975

[54] VALVE STEM WITH ROTATABLE HEAD FOR COMPRESSION FAUCET

[75] Inventor: Paul R. Hesse, St. Paul, Minn.

[73] Assignee: Union Brass & Metal Manufacturing Co., St. Paul, Minn.

[22] Filed: July 15, 1974

[21] Appl. No.: 488,788

Related U.S. Application Data

[63] Continuation-in-part of Ser. No. 402,766, Oct. 2, 1973, abandoned, which is a continuation of Ser. No. 240,257, March 30, 1972, abandoned.

[52] U.S. Cl. .................................. 251/88; 251/357
[51] Int. Cl.² ........................................... F16K 25/00
[58] Field of Search .......... 251/77, 84, 88, 356, 357

[56] References Cited
UNITED STATES PATENTS
933,779   9/1909   Newell ................................ 251/88

Primary Examiner—Henry T. Klinksiek
Attorney, Agent, or Firm—Frederick A. Fleming

[57] ABSTRACT

A valve stem is turned in a screw to position a valve head upon a valve seat at the internal inlet within a valve body. The head includes: a flat circular valve stem end; a washer situated upon the stem end; a cylindrical axle centrally fixed in the stem end, the axle extending completely through the washer; and a keeper fixed on the free end of the axle to retain the washer. The diameter of the axle is smaller than the internal diameter of the washer and the length of the axle is greater than the height of the washer so that there is unimpeded rotatability of the washer on the axle and so that there is a collateral channel for flow from the inlet to the valve cavity, a channel bounded by the washer on the one hand and by the keeper, axle and stem end on the other hand. The washer has a plastic face toward the valve stem end and a rubber face toward the valve seat, the washer being assembled from a rubber ring and a plastic bushing having one circular flange of diameter equal to the outside diameter of the rubber ring. The washer is assembled by insertion of the free end of the bushing into the central aperture of the rubber ring, the rubber ring expanding elastically to receive the bushing and grip it against disassembly of the washer. The plastic and the rubber are selected to provide that the coefficient of friction of the plastic/stem interface is less than the coefficient of friction of the rubber/seat interface, therefore affording that on closing the valve, frictional sliding occurs exclusively at the plastic/stem interface. A plastic is selected which is well suited to withstand wear and tear from frictional sliding, particularly as lubricated by the residual water film in the collateral channel. Rotational sliding at the plastic/stem interface largely uncouples the washer from torsion, thereby surmounting the major contributing cause of "self opening" of screw valves. The rubber ring is subject to elastic deformation but does not undergo frictional sliding, saving it from surface wear, the major cause of valve failure.

2 Claims, 4 Drawing Figures

VALVE STEM WITH ROTATABLE HEAD FOR COMPRESSION FAUCET

This is a continuation-in-part of application Ser. No. 402,766, filed Oct. 2, 1973 and which in turn is a continuation of application Ser. No. 240,257 filed Mar. 30, 1972, both now abandoned.

BACKGROUND OF THE INVENTION

1. Field of the Invention

My invention relates to water valves for service in household, office, and light industrial fixtures, such as lavatories. The field of art generally concerns the regulation of flow through a passage by means of pressing a head of a valve stem against an internal orifice within a hollow cavity, the valve body, the valve stem translating and rotating in a screw mounting in the valve body. The specific area of my invention includes valves which possess a valve head pivoted upon the valve stem (Cl. 251/84) with the action of the head limited to rotation (Cl. 251/88).

2. Description of the Prior Art

The research which led to my valve was undertaken after a study was made of a collection of hundreds of valves that had been returned on customer complaints from actual service applications. The study showed that almost all of the failures occurred in the rubber element at the head of the valve stem, where the rubber was deteriorated due to abrasion and spalling of the rubber itself.

Prior valves are also subject to unpredictable "self-opening" which is partly due to twist imparted in the rubber element during closure, the twist tending to unwind in the presence of vibrational disturbance, turning the stem.

The contemporary valve purchaser is discriminating, demanding not only an attractive and serviceable valve at a competitive price, but a valve possessing a "quality feel" when actuated by the hand.

For competitive merchandise, machining tolerances must be reasonable; a problem exists in compensating for the misalignment of valve stem with respect to the valve seat and for eccentricity of the rubber element on the face of the valve stem, such errors tending to aggravate the problem of wear of the face of the rubber element.

My valve meets these problems through the use of a freely rotating valve head, mounted to provide a collateral channel for flow, lubricating the rotationally sliding surfaces.

One may view the background of my invention on the one hand from the standpoint of my personal experience and my company's experience with the practical valves which generally meet the demands of the marketplace and on the other hand from the largely theoretical standpoint of the patent literature which has been classified in the rotary valve head category most closely resembling my invention. Uppermost in my mind when I invented the valve of this application was the correction of the wear problem associated with my company's competitive line of valves which incorporated a rubber element fixed to the valve stem against rotation. My valve does in fact correct that problem. It is somewhat speculative, on the other hand, to hold out that my valve is an improvement over other rotary head valves which have their existence only in the patent literature and have never been seen in the marketplace. Nonetheless, my valve is both structurally and functionally distinguishable from the rotary head valves of the patent literature.

Valves having stems with rotatable heads are the subject of an abundant patent literature. Those skilled in the art long ago apparently recognized the merit in the idea, to eliminate frictional sliding of the rubber element that participates in valving, but to my knowledge no one has heretofore invented a practical valve realizing the merits of the idea.

One group of inventions employs one (U.S. Pat. No. 3,281,111 10/1966 Cart) or a plurality (U.S. Pat. No. 2,121,315 6/1938 Black) of washers, or washers and ferrules (U.S. Pat. No. 2,277,251 3/1942 Palmer). Such multiple element constructions introduce one or more additional interfaces and/or annular spaces, affording new paths for leakage. Modifications of these designs have apparently been made with the object of sealing against leakage, but comprise free rotatability (cf. U.S. Pat. No. 3,281,111, supra).

Another group of inventions employs a metal or plastic flanged bushing having an integral seal in the bushing end opposite the flange. Such configurations prevent leakage through the central pivot, but suffer the disadvantage of requiring attachment of the head element by pocket mounting, the pivot extending into but not penetrating the bushing. In such valves the rubber element cannot rotate with complete freedom since the pocket mounting itself employs frictional holding means, such as a spring socket (U.S. Pat. No. 2,077,766 4/1937 Mead), a compression ring (U.S. Pat. No. 2,148,195 2/1939 Esnard) or spring fingers (U.S. Pat. No. 2,978,220 4/1961 Morsch). Another disadvantage is the lack of positive means for retaining the rubber member onto the valve stem end, such that if the rubber member adheres to the valve seat by "pressure welding" the rubber member may be pulled off of the bushing or the head may separate as a whole from the pocket mounting, thereby disabling the valve in service.

Furthermore, the above inventions suffer the disadvantage of added cost due to manufacture and assembly of the multicomponent parts. The articles of the cited patents have not received acceptance in the industry and the valves are not found in the marketplace.

One must not lose sight of the fact that the preponderance of valves in service employ a rubber element ("faucet washer") fixed on the end of a valve stem. This conventional design has been proved generally satisfactory for many years; it is a rugged, simple, practical design and it will not yield its established place in commerce to any marginal change or improvement. Any valve which is to supplant the conventional design must not only be substantially superior, but in the conservative plumbing trade, the design must be compatible and even interchangeable with the conventional design. My valve is such a valve and it is receiving that acceptance by industry.

SUMMARY

1. Objectives

The overall object of my invention is to satisfy a need for a valve which may be manufactured by ordinary efficient machining techniques, subject to reasonable standards and tolerancces to give a population (in the statistical sense) of valves which, randomly selected, are suited for diverse applications in the market such that an extremely large fraction of the population of valves performs reliably for an extended service, free of any need for replacement of the valve or servicing of its parts. More specific objects include the following: to provide a valve that is essentially free of service failure due to deterioration of the face of the rubber element participating in valving against a valve seat; to provide a valve having a selected rubber element that is employed for its superior properties in elastic deformation but which is spared the abrasive action of frictional sliding; to provide a valve which incorporates a pair of alternative surfaces to be subject to the abrasive sliding friction that attends rotation of the valve stem screw and to select materials for those alternative surfaces which are adapted to withstand the frictional sliding with minimal wear; to provide means for lubricating those alternative surfaces by the controlled fluid, water, once every open-close cycle; to provide a valve with a rotary valve head mounted with sufficient freedom that it is not scrubbed in oscillation on the valve seat during closure due to eccentric location of the mounting means relatable to reasonable manufacturing tolerances; to provide a valve with a rotary head on a valve stem wherein the head is retained upon the valve stem by impedimentary keeping means and not merely by frictional gripping; to provide a valve which is not subject to "self opening;" to provide a valve with a "quality feel" including an easy "break away;" and to provide a valve which is compatible with the preponderant fixed washer type for servicing.

2. The Invention

The valve body is a hollow casting with three apertures, an outlet to direct flow, an inlet for connection to a water supply and a control aperture to sealably and removably receive a valve stem and bonnet assembly. The inlet and control apertures are circular, share a common cylindrical axis and breach opposite sides of the valve body. The stem and bonnet assembly is an elongated modified cylinder, the valve stem, assembled by means of a coarse screw and an O-ring seal into a cylindrical sleeve adaptor, the bonnet. The valve stem when turned translates rotatively in the coarse screw on the common axis, causing the head of the stem to approach toward or withdraw from the valve seat, the head of the stem being juxtapositionable upon the seat, to cover the inlet, throttling flow when the valve is connected for service. The head includes: a flat circular valve stem end; a washer situated upon the stem end; a cylindrical axle centrally fixed in the stem end, the axle extending completely through the washer; and a keeper fixed on the free end of the axle. The diameter of the axle is smaller than the internal diameter of the washer and the length of the axle is greater than the height of the washer, providing for unimpeded rotatablity of the washer on the axle and also affording a collateral channel for flow from the inlet to the valve cavity whenever the washer is intermediately positioned upon the axle, a channel bounded by the washer on the one hand and the keeper, the axle and the stem end on the other hand. The washer has a plastic face toward the valve stem and a rubber face toward the valve seat, the washer being assembled from a rubber ring and a plastic flanged bushing having one circular flange of diameter equal to the diameter of the rubber ring. The washer is assembled by insertion of the free end of the bushing into the central aperture of the rubber ring, the rubber ring deforming elastically to receive the bushing and thereafter clutching the bushing against disassembly of the washer. The faces of the washer are circular and flat, to stand in planes parallel with the end of the valve stem and the valve seat.

3. Brief Discussion of Operation

When the valve is connected to a water supply at the external orifice of the inlet, if the valve stem is turned to remove the valve head from the valve seat, flow occurs through the internal orifice, radiates across the face of the valve seat, is collected in the valve cavity and directed toward the outlet by the shape of the cavity. As the stem is turned to close the valve and the head of the valve approaches the valve seat, the washer is hydraulically centered in the gap between the valve stem and the valve seat. Flow is then divided between the primary and the collateral channels, flow in the collateral channel flooding the plastic/stem interface and lubricating it. As the valve stem is further advanced the valve head fills the gap and both primary and collateral channels are closed. Cinching the valve results in rotational sliding at the stem/plastic interface and stress deformation of the rubber ring, to conform with surface irregularities of the valve seat and compensation for slight misalignment of the elements in the common axis. Sliding at the rubber/seat interface is avoided, sparing wear and tear on the rubber face of the washer. The stem/plastic interface is not subject to uneven wear due to axial misalignment and the plastic may be selected for its ability to resist wear.

4. Advantages

The general advantage of my valve over the fixed-washer valves that are in general service is its extended service life which results from the elimination of frictional sliding at the rubber/seat interface. A further advantage is a quality feel which is related to easy turning of the stem, to a sense of stop during closure and to an easy break away on opening, all of which are experienced by the operator in using the valve. This perception is believed to be related to three factors, the primary factor being the reduction in torque required to turn the screw against frictional sliding at the head interface, the second factor being the easy running O-ring seal of the stem and bonnet assembly, and the third factor being the use of a fast double lead screw within the stem and bonnet assembly. It may be noted that the fixed-washer valve is so generally accepted in the marketplace that it is unlikely that a merchandiser would risk making the change to my valve on the basis of extended service alone, but that my invention has saleable utility on the basis of the quality feel of the valve as a whole.

A specific advantage of my valve over those of the type employing a rotating head incorporating a flanged bushing having an integral seal in the bushing end opposite the flange is that in my valve the stem/head interface is opened and lubricated with water each time the valve is opened and closed while in the sealed bushing type the rotating element is retained hydrostatically at the stem/head interface, the interface being essentially dry.

5. Problems Solved

The general problem that is solved by my valve is valve failure due to deterioration of the rubber valving element. Specific problems that are solved with respect to the prior art recorded in the patent literature include the following. The problem of leakage at the valve stem-valve head junction is solved by the use of a tough structural plastic having the capacity to make a water tight seal when located nominally against the valve stem end, the result of the inherent qualities of resilience and the capacity for plastic flow of the microscopic asperities of the plastic surface. Cf. *Friction, An Introduction to Tribology*, by F. P. Bowden and D. Tabor, Doubleday and Company, Garden City, N.Y., 1973, Chapters IV and VI. The problem of compromising rotatability of the valve head through friction attachment means is eliminated by my freely fitting axle and keeper. Prior art rotatable head valves have generally taken forms which make them incompatible with the common fixed washer valves; special parts are needed to effect repairs. This constitutes a problem running to the practical utility of such valves. My valve is compatible with the fixed washer valves: if the valve head should require servicing when no washer of the preferred type is available, a suitable emergency repair can be made using a conventional faucet washer, converting the valve to a fixed washer type.

"Pressure welding" is a phenomenon sometimes observed in the interface between rubber and brass when the two are maintained in contact under pressure for a prolonged period of time. It is common to find that the fixed rubber element of conventional valves is pressure welded to the valve stem end, therefore complicating the replacement of a faulty rubber element. Pressure welding of the washer of my valve does not occur because the plastic flange of the flanged bushing stands between the rubber and the brass as a barrior.

Pressure welding is sometimes observed at the valve seat/rubber element interface of conventional valves which have stood in a closed position for a long period of time. When this happens in the conventional valve, the pressure weld must be torn apart in shear, to the injury of the rubber element. When such pressure welding occurs in a valve having a rotational pocket-mounted head, the head may be retained on the seat, the pocket mounting dislodged and the valve disabled in service. It may be noted that these problems are circumvented in my valve because if pressure welding occurs, the washer-seat bond is separated by a peeling action which is less disruptive of the surface than a shearing action. Pressure welding cannot result in dislodgment of the valve head of my valve, since the positive keeping means will retain the rubber element on the axle.

Manufactured goods of this kind is subject to some dimensional variations and misalignments, the error having its basis in the limitations of man and machine. For goods that are to be competitively priced, reasonable dimensional tolerances must not interfere with performance of the valve. Small misalignments may be encountered in the axes of the valve seat and the valve head. In a conventional valve having a fixed rubber element, such off-axis misalignment results in oscillatory working of the face of the rubber element in the internal orifice of the valve seat. In my valve, such misalignment is less injurious to the rubber element, because once the washer is abutted on the seat, rotation stops at the rubber-seat interface and the rubber face is merely deformed elastically on the internal orifice slightly off center or off planar, which deformation is easily within the capacity of the rubber. In my valve if the axle of the valve is not aligned with the common axis, the washer might be expected to oscillate eccentrically in the seat in cinching the valve. However, this axle misalignment will not result in oscillation provided that the extent of the misalignment does not exceed the clearance between axle and bushing, since the axle, centered in the bushing initially due to hydraulic centering, will itself oscillate within the bushing but will not move the bushing. In the statistical sense this fact contributes to the reliability of the population of valves manufactured within the tolerances.

In water valves having a fixed rubber element at the head of the valve stem, frictional sliding of the rubber element against the valve seat takes place during closure, when cinching the valve. However, during closure, the rubber/seat interface is flooded with water, the water tending to lubricate the interface and diminish the coefficient of friction and the wear that would take place due to frictional rotational sliding. Once closed, however, the water lubricant is largely squeezed out, so that the surfaces are subject to a higher coefficient of sliding friction on opening than on closing. Moreover, the force on opening is the product of the coefficient of static friction times the load and not the coefficient of sliding friction times the load as in closing. For rubber against dry metal surfaces, the coefficient of static friction is large. Consequently, opening the valve, before the torque has reached a magnitude sufficient to overcome the static friction, the torque may be sufficient to exceed the strength of the rubber in shear and the substance of the rubber may tear in planes adjacent to the surface. This is observed in practice, the rubber elements having little pieces torn out in the area of contact with the seat.

Contrast that with what happens at the rubber face of the washer of my water valve. On closure, the rubber face is simply arrested on the valve seat on contact, avoiding any wear due to frictional sliding. In the closed position the rubber face is subject to a relatively small static friction related to the torque transmitted through the washer from the plastic face. Opening the valve, that static frictional force is eliminated; the rubber face never is subjected to high static frictional force; it is simply lifted off from the seat by a translational force applied by the keeper and by the supply water pressure.

The facts which I have just given are the physical basis for the easy break away that is experienced with my valve.

DESCRIPTION OF THE PREFERRED EMBODIMENT

Structural Description

Figure 1:
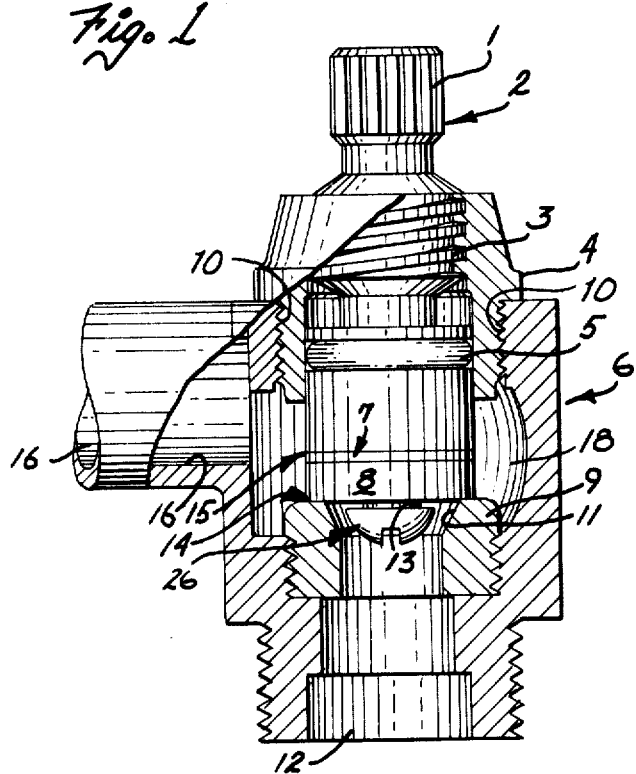
FIG. 1 is a partial vertical section through the valve assembly, the valve illustrated in the closed mode.
Figure 2:
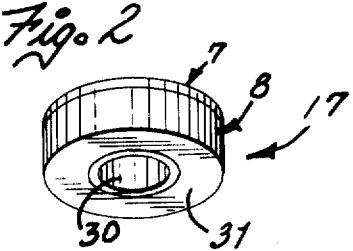
FIG. 2 is a perspective view of the assembled washer.

My invention is a valve (FIG. 1) having a hollow body 6, typically a brass casting, with three apertures therein, an outlet 16, an inlet 12 and a control aperture 10. The inlet 12 and the control aperture 10 are both substantially cylindrical, have a common axis and breach opposite walls of the body 6. Inside of the cavity 18 of the valve body 6, centered in and around the inlet 12 is a collar, typically of brass, the valve seat 9 which has a flat annular face normal to the common axis and facing the control aperture 10 in the opposite wall. An elongate, generally cylindrical valve stem (FIGS. 1, 2) typically of brass, is assembled through a cylindrical girdle, the bonnet 4, by means of coarse screw threads such as the double lead threads 3 and a seal such as the rubber O-ring 5. The stem 2 and bonnet 4 assembly is removably sealed into the control aperture 10, typically by means of screw threads as illustrated in FIG. 1, thereby aligning the axis of the valve stem 2 with the common axis that includes the valve seat 9. The valve stem 2 when rotated on its axis translates rotatively in the screw 3 causing the head (FIG. 4) of the stem to approach toward or withdraw from the valve seat 9 at the interface 14, the head being juxtapositionable upon the seat 9 to cover the internal orifice 11 of the inlet 12, throttling flow when the valve is connected in service. The head (FIG. 4) includes the flat circular valve stem end 19, a washer 17 (FIG. 2) situated upon the stem end 19 (FIGS. 3, 4) a cylindrical axle 27 centrally fixed to the stem end 19 by means such as the screw 29 inserted into the tapped bore 20 as limited by the step 25 in the shank of the screw 29, the axle 27 extending completely through the aperture 30 (FIG. 2) of the washer 17; and a keeper 28 fixed to the free end of the axle 27 to retain the washer 17 on the axle at the shoulder 13 (FIG. 1).

The diameter of the axle 27 is smaller than the aperture 30 of the washer 17 and the length of the axle 27 is greater than the height of the washer 17, providing for unimpeded rotatability of the washer 17 on the axle 27 and also affording a collateral channel for flow from the inlet 12 to the valve cavity 18 whenever the washer 17 is intermediately positioned on the axle 27. The collateral channel is bounded by the washer 17 on the one hand and by the keeper 28, the axle 27 and the valve stem end 19 on the other hand.

Figure 3:
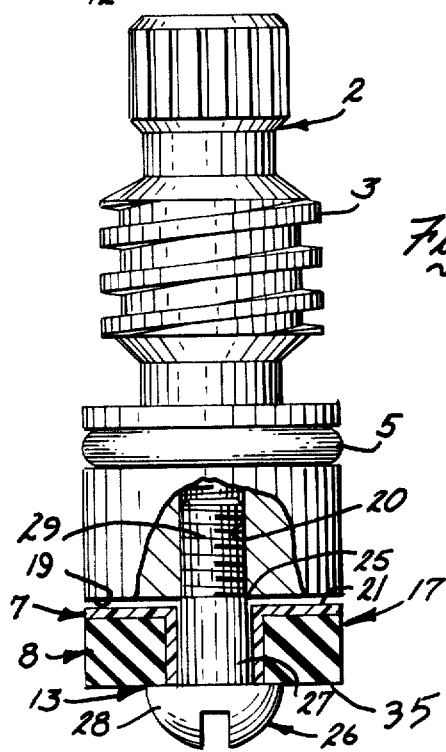
FIG. 3 is an enlarged elevational view of the valve stem with valve head. The washer is illustrated as it would position itself under the influence of gravity, the washer supported by the keeper.

The washer 17 has a plastic face 21 toward the valve stem end 19 and a rubber face 31 toward the valve seat 9, the washer 17 being assembled from a rubber ring 8 and a plastic flanged bushing 7 having one circular flange of diameter equal to the diameter of the valve stem end 19 (FIG. 3). The washer 17 is assembled by insertion of the free end of the bushing 22 into the central aperture 24 of the rubber ring 8, the rubber ring 8 expanding to receive the bushing 22 and thereafter clutching the bushing 22 against disassembly. The rubber ring 8 has plane parallel faces separated by a height substantially equal to the length of the bushing 22, typically one-eighth of an inch. The outside diameter of the rubber ring is substantially equal to the outside diameter of the flange of the flanged bushing 7. The inside diameter of the rubber ring 8 is slightly smaller than the outside diameter of the bushing 22 to permit an elastic fit.

Figure 4:
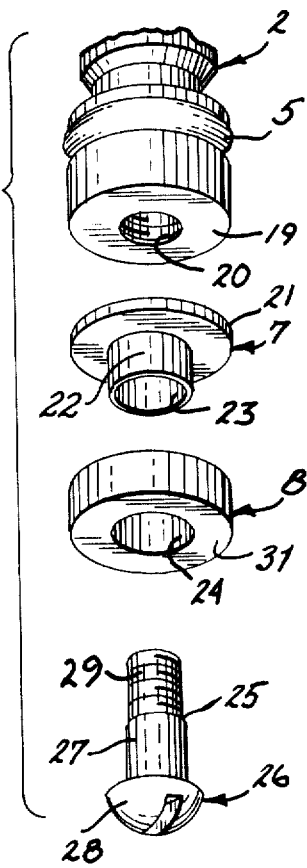
FIG. 4 is an exploded perspective view of the valve stem and the parts comprising the valve head.

The preferred embodiment of the axle 27 and keeper 28 is a machine screw 26 having an unthreaded shank and a slotted round head (FIGS. 3, 4).

The tolerance in the dimensions of the axle 27 within the bearing surface 23 of the bushing 22 of the flanged bushing 7 is held to the minimum consistent with free rotation in order to exclude grit particles. Clearances of 0.001 to 0.006 inch per side afford valves with suitable performance.

The running length of the axle 27 is from 0.001 to 0.010 inches longer than the height of the washer 17.

The diameter of the keeper 28 is substantially larger than the inside diameter of the rubber ring 8 in order to assure retention of the rubber ring 8 as well as the flanged bushing 7.

The washer 17 affords the valve maker the opportunity to select the most favorable rubber face 31 for engagement of the valve seat 9 at the interface 14 and the most favorable structural and frictional plastic surface 21 for engagement of the flat valve stem end 19 in the sliding interface 15.

Neoprene brand of polychloroprene rubber is representative of the high performance rubbers that are suitable for manufacture of the rubber ring 8 by injection molding or cutting from cured stock.

Delrin (Trademark Registered to E.I. duPont de Nemours and Co., Wilmington, Del.) brand of polyacetal plastic is representative of the moldable structural plastics which are suitable for manufacture of the plastic flanged bushing 7.

The surface of the valve stem end 19 is finished flat by ordinary machining methods.

Description of Operation

The valve stem 2 is turned in the screw 3 by applying torque to the keyed external end 1 by a handle or other means (not illustrated). When connected to a water supply at the external orifice of the inlet 12, the valve is open and flow proceeds therethrough when the valve stem 2 is positioned in the screw 3 to remove the valve head (FIGS. 3, 4) from the valve seat 9 (FIG. 1), flow issuing from the internal orifice 11, radiating across the valve seat, being collected in the cavity 18 and directed to the outlet 16 by the shape of the hollow casting 6. When full open, the primary channel across the face of the valve seat carries virtually the total flow.

Three terms are now defined: the axle length, being the length of the axle 27 on which the washer 17 can stand and translate; the washer height, being the distance between the faces of the washer 17 and the stem-seat gap, being the distance from the flat valve stem end face 19 to the face of the valve seat 9 (cf. the interface 14).

When the valve stem is turned toward closure, a range is reached where the stem-seat gap approximates the axle length; in this range hydraulic centering urges the washer 17 into a position intermediate between the stem face 19 and the value seat 14 and flow takes place through the collateral channel as well as the primary channel, flooding the valve stem face 19 with water. Hydraulic centering also causes the washer 17 to take a centric position with respect to the axle 27, the clearance in the annular sleeve space being equally divided.

Hydraulic centering is the result of pressure differentials that are neutralized by shifts of movable bodies subject to those pressure differentials. The pressure differentials arise as the result of reduced pressure in regions of greater flow speed, as governed by Bernoulli's principle, "where the speed is great, the pressure is small."

At the instant the stem-seat gap equals the height of the washer 17, only a thin film of water remains on the plastic/stem interface 15. The thin film is penetrated by the microscopic asperities of the surfaces; some of the water is extruded from the edges of the interface 15; other residual water remains trapped in the microscopic valleys in the interface, giving hydraulic support to the assembly and lubricating the surfaces for subsequent rotation. In cinching the valve the valve stem 2 is further advanced toward a stem-seat gap smaller than the height of washer 17; the washer 17 is stressed in deformation and in torsion, due to the thrust and torque of the stem 2. The load on the washer 17 increases as the stem-seat gap is reduced, due to elastic restoring forces in the rubber ring 8. Rotational frictional sliding occurs at the plastic/stem interface 15 when the torque applied by the stem 2 exceeds the product of the coefficient of friction for that surface (as lubricated by water) multiplied by the load.

A plastic, such as polyacetal, and a rubber, such as polychloroprene, are selected such that the coefficient of friction of the plastic/stem interface 15 is smaller than the coefficient of friction of the rubber/seat interface 14. Rotational sliding therefore will always occur first at the plastic/stem interface 15, never at the rubber/seat interface 14. Still further advancement of the valve stem 2 increases the load (shared in common by both interfaces) and increases proportionately the sliding frictional force in the plastic/stem interface 15, tending to increase the torsion of the washer. But once sliding is initiated at the plastic/stem interface 15, torsion in the washer 17 can never reach a magnitude which would overcome the static frictional force at the rubber/seat interface 14, since the maximum torque coupled into the washer can never be greater than the sliding frictional force in the plastic/stem interface 15, a force which is always less than the static frictional force of the rubber/seat interface 14, whatever the common load. Rotational sliding at the rubber/seat interface 14 is therefore circumvented.

To open the valve, torque of the opposite sense is applied at the keyed end 1 of the valve stem 2. When the magnitude of the torque exceeds the sum of the static friction in the screw threads 3 and the static friction in the interface 15, the valve stem 2 rotates and translates in the opposite direction, withdrawing the head (FIG. 3) from the valve seat 9. The interfaces at 15 and 14 open simultaneously, dividing the small initial flow between the primary and the collateral channels. If the rubber face 31 has adhered to the valve seat 9 at the interface 14 then the collateral channel conducts the flow until the keeper 26 engages the rubber surface 31 at the shoulder 13, whence the washer 17 is carried away by the keeper 26 and the rubber face 31 is peeled away from the valve seat 9, the peel being from inward toward outward. When a valve in service is open, an opening exists at the interface 15 (FIG. 3) because of differential pressures within the cavity 18 and across the seat 9, a reduced pressure at the seat 9 being attendant to the speed of flow, following Bernoulli's principle. Cf. *Handbook of Hydraulics*, H. W. King and E. F. Brater, 5th Ed., McGraw Hill, New York, N.Y., 1963, Section 4-13. Observations using transparent valve bodies confirm that the position of the washer is governed by hydraulic pressures and is not visibly affected by the orientation of the valve with respect to gravity.

Construction of the Washer

Using experimental valves having transparent walls, it is observed that after my valve has been closed and then opened, the flange 21 of the flanged bushing 7 has creeped to a slightly advanced position in rotation relative to the rubber ring 8 suggesting that frictional sliding of the nature of multiple disk clutching has occurred. But the coefficient of friction of the plastic/rubber interface is greater than the coefficient of friction of the stem/plastic interface 15 so that the maximum torque coupled into the flanged bushing 7 is insufficient to initiate sliding at the plastic/rubber interface.

The correct explanation for the creep is believed to be the following: When the valve is closed the rubber ring 8 is subjected to twist due to the torque coupled through the stem/plastic interface 15 and through the plastic/rubber interface. The rubber ring 8 is simultaneously subject to stress deformation, producing viscoelastic flow in the direction of the circumference of the washer 17. Expansion of the circumference is accompanied by enlargement of the central aperture 24 of the rubber ring 8, freeing the elastic engagement of the bushing 22 by the rubber ring 8 and permitting the central aperture 24 of the rubber ring 8 to rotate under internal stresses to a neutral position midway between the angular separation of its two surfaces brought about by the torque. It must be noted that the center area of the rubber ring 8 is not subject to the restraints of static friction, since it is not engaged at the seat 9, while the circumference of the rubber ring 8 is subject to the restraint. On opening the valve, stress on the rubber ring 8 is removed and the central aperture 24 contracts, now clutching the bushing in a new position. The valve now opened and the static frictional forces removed from both faces of the rubber ring 8 it adjusts as a whole to an unstressed and untorqued position, now rotated with respect to the flanged bushing 7 by approximately one half the angle subtended by twist displacement of the faces of the rubber ring 8 during closure.

Thus in service, the rubber ring 8 is worked against the plastic flanged bushing 7, and while the rubber/plastic interface is not subject to significant wear therefrom, it must be noted that the forces which are responsible for the creep displacement are powerful shear forces, acting in the rubber/plastic interface. A special merit of the means by which I assemble the washer for my valve is now clear: The insertion of the bushing 22 into the aperture 24 of the rubber ring 8 results in an elastic bonding that is capable of cyclical readjustment under these powerful shear forces. If the rubber moeity and the plastic moeity were joined by permanent bonding, such as vulcanization, the powerful interfacial shear forces would act to damage the union. Accordingly, the best mode for construction of the washer 17 is by elastic fit, as discussed earlier.

I claim:

1. I claim a valve for use in controlling a water supply in lavatory fixtures, comprising the following combination of mechanical elements:

a valve body, being a casting surrounding an internal cavity, to contain and control flow;

an outlet aperture in the valve body to deliver the flow to a point of discharge;

an inlet aperture in the valve body, being a cylindrical opening with an external orifice for connection to a water supply and an internal orifice within the internal cavity;

a control aperture in the valve body, being a cylindrical opening on the side of the cavity opposite the inlet aperture, the control aperture and the inlet aperture sharing a common axis;

a valve seat, being a collar, removably inserted into the internal orifice of the inlet aperture, having a flat annular face centered on the common axis and directed toward the control aperture;

a bonnet, being a cylindrical sleeve adaptor with an external diameter for removable sealed assembly into the control aperture, and having an internal diameter to receive a valve stem, being an elongated cylinder; the bonnet and the valve stem having, respectively, internal and external coarse screw threads on the end toward the outside of the valve body and regular cylindrical surfaces on the end adjacent to the internal cavity, the valve stem having an annular groove on the regular cylindrical surface to receive an O-ring, to seal the valve stem within the bonnet;

means on the exterior end of the valve stem for application of torque to rotate the valve stem;

a flat circular face on the interior end of the valve stem, being normal to the common axis and plane parallel with the valve seat;

a cylindrical axle centrally fixed in the flat circular face and extending on the common axis from the flat circular face;

a washer situated on the flat circular face, the axle extending completely therethrough, the washer having a plastic face toward the flat circular face of the valve stem and a rubber face toward the valve seat, wherein the plastic and the rubber are selected to provide that the coefficient of friction of the flat circular face of the valve stem against the plastic face is less than the coefficient of friction of the rubber face against the valve seat, the washer being assembled from a plastic flanged bushing having a flat circular flange at one end of the bushing, the flange being equal in diameter to the flat circular face of the valve stem, and a rubber ring of external diameter substantially equal to the external diameter of the flat circular flange and of internal diameter slightly smaller than the external diameter of the bushing, the rubber ring having plane parallel faces, wherein the washer is assembled by insertion of the free end of the bushing into the central aperture of the rubber ring, the rubber ring clutching the plastic bushing by elastic contraction;

a keeper, fixed to the free end of the axle, to retain the washer on the axle, wherein the diameter of the axle is smaller than the internal diameter of the washer and the length of the axle is greater than the height of the washer, thereby providing for unimpeded rotatability of the washer on the axle and also affording a collateral channel for flow from the inlet to the internal cavity whenever the washer is positioned intermediately on the axle, the collateral channel bounded by the washer on the one hand and the keeper, the axle and the flat circular face of the valve stem on the other hand;

wherein the valve stem when turned at the external end by an applied torque translates rotatively in the coarse screw, causing the internal end of the stem to approach or withdraw from the valve seat, the washer being positionable upon the valve seat, to cover the internal orifice of the inlet, throttling flow at a primary channel radiating across the valve seat;

whereby hydraulic centering of the washer on the length of the axle occurs prior to complete closure, opening the collateral channel and providing a flow of water across the flat circular face of the valve stem, to lubricate the interface, and whereby on cinching the valve closed, sliding frictional rotation takes place exclusively at the interface between the flat circular face of the valve stem and the plastic face of the washer, thereby largely uncoupling the interface between the valve seat and the rubber face of the washer from torque and sparing the rubber face from frictional abrasion and stress tearing.

2. In a valve of the type having a valve stem mounted in a screw for moving against a valve seat in a common axis, to throttle flow at the valve seat, a valve head comprising the following mechanical elements:

a flat circular face on the end of the valve stem, machined normal to the valve stem axis;

a cylindrical axle centrally fixed in the flat circular face and extending on the axis from the flat circular face;

a washer situated on the flat circular face, the axle extending completely through the washer, the washer having a plastic face toward the flat circular face of the valve stem and a rubber face toward the valve seat, wherein the plastic and the rubber are selected to provide that the coefficient of friction of the flat circular face against the plastic face is less than the coefficient of friction of the rubber face against the valve seat, the washer being assembled from a plastic flanged bushing having a flat circular flange at one end of the bushing, the flange being equal in diameter to the flat circular face of the valve stem, and a rubber ring of external diameter substantially equal to the external diameter of the flat circular flange and of internal diameter slightly smaller than the external diameter of the bushing, the rubber ring having plane parallel faces, wherein the washer is assembled by insertion of the free end of the plastic bushing into the central aperture of the rubber ring, the rubber ring clutching the plastic bushing by elastic contraction;

a keeper, fixed to the free end of the axle, to retain the washer on the axle, wherein the diameter of the axle is smaller than the internal diameter of the washer and the length of the axle is greater than the height of the washer, thereby providing for unimpeded rotatability of the washer on the axle and also affording a space between the keeper, the axle and the valve stem on the one hand and the washer on the other hand.

* * * * *